US007595030B2

(12) United States Patent
Joannou

(10) Patent No.: US 7,595,030 B2
(45) Date of Patent: Sep. 29, 2009

(54) AIR-CIRCULATING, IONIZING, AIR CLEANER

(75) Inventor: Constantinos Joannou, Nepean (CA)

(73) Assignee: Headwaters R & D, Inc, Ottawa (CA)

( * ) Notice: Subject to any disclaimer, the term of this patent is extended or adjusted under 35 U.S.C. 154(b) by 803 days.

(21) Appl. No.: 11/034,364

(22) Filed: Jan. 12, 2005

(65) Prior Publication Data

US 2005/0214180 A1 Sep. 29, 2005

Related U.S. Application Data

(63) Continuation of application No. 10/355,198, filed on Jan. 31, 2003, now abandoned, which is a continuation-in-part of application No. 10/067,433, filed on Feb. 7, 2002, now Pat. No. 6,919,053.

(51) Int. Cl.
*B01J 19/08* (2006.01)

(52) U.S. Cl. ....................... 422/186.04; 422/121; 96/97

(58) Field of Classification Search ............ 422/186.04, 422/121; 96/97
See application file for complete search history.

(56) References Cited

U.S. PATENT DOCUMENTS

| | | | | | |
|---|---|---|---|---|---|
| 4,335,414 | A * | 6/1982 | Weber | ........................ | 361/100 |
| 4,556,861 | A * | 12/1985 | Hyodo et al. | ............... | 340/441 |
| 5,538,692 | A * | 7/1996 | Joannou | ..................... | 422/121 |
| 6,176,977 | B1 | 1/2001 | Tailor | | |
| 6,228,149 | B1 | 5/2001 | Alenichev | | |
| 6,544,485 | B1 * | 4/2003 | Taylor | ................... | 422/186.04 |

* cited by examiner

*Primary Examiner*—Kishor Mayekar
(74) *Attorney, Agent, or Firm*—Albert Peter Durigon

(57) ABSTRACT

An air cleaner is described wherein an ion wind is generated by an ionizing element and directed to pass over a dust collector surface. By proper design and adjustment of the ionizing element and collector, the unit can be operated without emitting charged particles, if any, in other than the direction of orientation of the dust collector surface and thus avoiding smudging of the surrounding walls. The collector may be cylindrical in form and may be separately detachable, rendering it readily available for cleaning.

19 Claims, 5 Drawing Sheets

AIR-CIRCULATING, IONIZING, AIR CLEANER

This application is a continuation application of application Ser. No. 10/355,198, now abandoned, filed by the same inventor on Jan. 31, 2003 which, in turn, is a continuation-in-part of application Ser. No. 10/067,433 filed Feb. 7, 2002, now U.S. Pat. No. 6,919,053.

FIELD OF THE INVENTION

This invention relates to air filtration systems. In particular it relates to an air filtration system based upon forming an air current of ionized air and the collection from such air current of dust particles by means of a charged surface.

BACKGROUND OF THE INVENTION

U.S. Pat. No. 5,538,692 to Joannou describes an ionizing type air cleaner having an exposed ionizing needle and a collector element in the form of a charged, partially conducting, surface. (See FIG. 1) Ions released from the needle spread-out through the air of the surrounding environment in the form of an "ion wind", charging particles of dust present therein. By reason of the charge on the collecting surface, such dust particles are drawn to and become attached upon the collecting surface. Dust removed from the air in this manner may be readily disposed of by simply wiping the collecting surface with a rag or the like.

Although the collecting plate will attract and hold a substantial part of the dust present in the air flow, nevertheless some dust and oily aerosols will still be present in the air flow that moves past the collecting plate. A number of these particles will still be charged. It has been found that such ionized particles as are not collected on the collecting plate have a tendency to collect on adjacent uncharged surfaces, such as walls. Over time, the collection of particles on wall surfaces can become visible as a discoloration. This is an undesirable effect. This disadvantage arises because this air cleaner acts as a "fountain of ions" with its collection surface positioned beneath the ion source, requiring ions to flow outwardly before being collected.

A need exists for an ionization-based air cleaner that has a reduced tendency to produce discoloration on adjacent surfaces. The invention herein addresses that objective. This invention is a continuation-in-part of U.S. application Ser. No. 10/067,433 filed Feb. 10, 2002 (the contents of which are adopted herein by reference) which application partially provides part of the disclosure and solution set-out herein, now U.S. Pat. No. 6,919,053.

It has been disclosed in U.S. Pat. Nos. 6,176,977, and 6,312,507 to Taylor et al to provide a pointed ion source upstream in an ion induced airflow, with washer-like ring electrodes positioned downstream. Dust charged by ions is collected on the flat surfaces of the ring-like electrodes facing the ion source as well as between plates.

The design of U.S. Pat. No. 6,176,977 does not, however, address confining the ion-wind induced airflow, or providing an airflow path that will minimize interference with such airflow. The invention disclosed herein, however, incorporates such features.

The invention in its general form will first be described and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the invention in one aspect, an ion-emitting source or "ion source", preferably in the form of a needle, releases ions to charge dust particles in the surrounding air. This ion source is placed in a position whereby charged dust particles will flow, along with the flow of air that is induced to flow by an "ion wind", away from the needle to pass through the center of a dust collecting guide that is preferably in the form of a dust collecting cylinder.

This cylinder serves as a guide or duct for the flow of air. This dust collecting cylinder includes, at least and preferably only on its inner surface, a conductive plate or element connected to a potential source which acts as a charged dust collection surface. This dust collection surface is optionally but preferably in the form of a substantially encircling collecting plate, that contains the flow of the air as it collects charged dust particles. The dust-depleted air then passes on, outwardly, from the collecting cylinder. Alternately, the dust collection surface can be intermittently formed on the inside of a cylinder of non-conductive materials or as mutually opposed inwardly directed electrodes in the form of discrete conductive panels.

The dust collection surface carries an ion-inducing potential which, based on its proximity to the needle and its electrical potential, serves as well as a counter-electrode to induce the release of ions from the ion source.

According to one variant of the invention, this guide cylinder and charged collecting plate are located vertically above the ion-emitting needle source. By placing the charged collecting plate above the ion source, an upwardly directed ion wind is formed. Air entrained by the ion wind approaches the ion source laterally and is then swept upwardly by the flux of ions introduced into the airflow by the ionizing needle. The collecting plate, located above the needle, does not block this upward flow of air but rather serves to guide the air flow.

The volume of air treated for dust removal is increased by the airflow arising from the ion wind that is created. This airflow may also be directed horizontally by placing the ion source and dust collecting guide in horizontal opposition.

A further advantage of providing a collecting plate in the form of opposed dust collecting electrode surfaces, preferably carried by a cylinder, that are positioned downstream from the ion source is that the opposed dust collecting surfaces will contain the air flow while attracting dust. Thus a cylinder with opposed inner dust collecting electrode surfaces may be positioned in the direct path of the ion wind originating from an ion source so that the quantity of charged particles that will be released laterally for potential collection on wall surfaces is reduced from that created by the fountain-form collector where the collection surface is positioned beneath the ion source.

The focusing of an ion wind, and hence the capacity for protection of wall surfaces from discoloration, can be further increased in another variant of the invention. In this variant the charged ion source is mounted on an insulating charge-collecting surface that is preferably otherwise exposed to the environment, producing a directed flow of ions. The ion source and charge-collecting surface are then positioned to direct the ion wind into the core of the opposed dust collection electrode surfaces. The ion source insulating surface is preferably made of a non-conducting or dielectric material, (polymeric plastic for example), which becomes charged with the same polarity as the ion source by the deposition of charge from the ions. This fixed charge repels the ions coming out of the ion source and directs them or focuses them in the direction of the collector. With the help of the repulsion surface and its positioning with respect to the collector electrodes, fewer ions are emitted in directions away from the collector. Thus, for example, when a cylindrical collector is oriented horizontally and positioned in sufficiently close proximity to the ion source so that virtually all of the focused ion wind passes horizontally through the core of the collector, this arrangement can ensure that charged dust particles in the ion wind are directed away from a wall, minimizing or excluding the formation of discolorization on the wall surface. Ideally, all ions emitted will become entrained in the air flow of the ion wind and be directed to pass through the dust collecting guide.

While an ion source may consist of a single needle, multiple needles and repulsion surfaces may be provided. Preferably such multiple needles should be sufficiently separated to avoid the mutual suppression of ions that may arise when similarly charged needles are placed in close proximity to each other.

The tendency for ions to form is proportional to the electrical field potential gradient present at the needle tip. This gradient may be enhanced by ensuring that the leading, upstream edge of the ion-inducing charged collection plate (located in front of the ion source, down-wind from the needle tips), is in relatively close proximity to the ion source, sufficient to induce the release of ions. This positioning also helps suppress the lateral escape of ions and charged dust particles. Of course, the collection surface should not be so close to the needle(s) as to risk arcing and preferably not so close as to induce the release of excessive amounts of ozone.

To protect persons handling this air cleaner device, it is preferable to provide mechanical shielding means around each needle. Shielding is appropriate because the ion source and dust collecting electrodes of the invention are fully exposed for possible human contact and are not protected within a housing. Such mechanical shielding means is preferably in the form of thin plastic posts or plates protruding from the repulsion surface. Preferably two, three or four such posts surrounding the needle are of a length sufficient to prevent injury to a hand passing over the needle tip. By using short posts, the surface around the needle tip may be conveniently cleaned with a simple brush, eg. a toothbrush.

The dust collecting surface(s) may be in the form of one or more opposed plate members or in the form of one or more conductive layers formed along the inwardly facing airflow guide surface(s). In the case of a cylindrical guide support the interior surface(s) may be circular or optionally may be generally oval-shape. According to this preferred arrangement of the invention dust is principally collected on the opposed interior collecting surface(s). The dust collecting electrode surfaces may be either self-supporting or carried on the inner face of a cylindrical support. While an entire dust collecting guide may be conductive, only the interior surface or an effective portion of the interior surface need be conductive. The exterior surface of the airflow guide, or cylinder, when employed, may be non-conductive. An advantage of providing the airflow guide of the invention with an exterior, insulating, fixed charge supporting surface, at least in the vicinity of its upstream edge proximate to the ion source, is that fixed charges formed on such a surface by arriving ions will tend to repel further ions and similarly charged dust particles. This effect will further enhance the channeling effect of employing a focused ion source as well as an airflow guide to contain the flow of dust-laden air.

A convenience of all of these variants arising from the cylindrical shape is that the collecting cylinder with its interior dust collecting surface may conveniently be removed for cleaning, and presents no sharp corners to conceal dust.

A further salutary feature of the invention is that the minor portion of ions not trapped on or discharged by the collecting surface may mix with surrounding air away from wall surfaces, if so directed, and if negative ions are employed and escape the collection surface(s), provide the reported health benefits arising from the presence of such ions in the air.

Another optional feature of the invention is the provision of a protective circuit which is incorporated within the power supply of the unit. Because the ionizing needles and collection cylinder are open to the outside world, a person can place his or her hand inside the device, close to the ionizing needles. In this case, a charge will be imparted on the body of the person and if the person then touches the collector electrode, he or she may get an unpleasant spark between their hand and such collector. To eliminate this effect, a sensing circuit is incorporated in the power supply that turns off the unit as soon as the slightest discharge occurs on the collector. Conveniently, the reset switch for this safety circuit can also serve as an on-off switch.

The foregoing summarizes the principal features of the invention and some of its optional aspects. The invention may be further understood by the description of the preferred embodiments, in conjunction with the drawings, which now follow.

Figure 5:
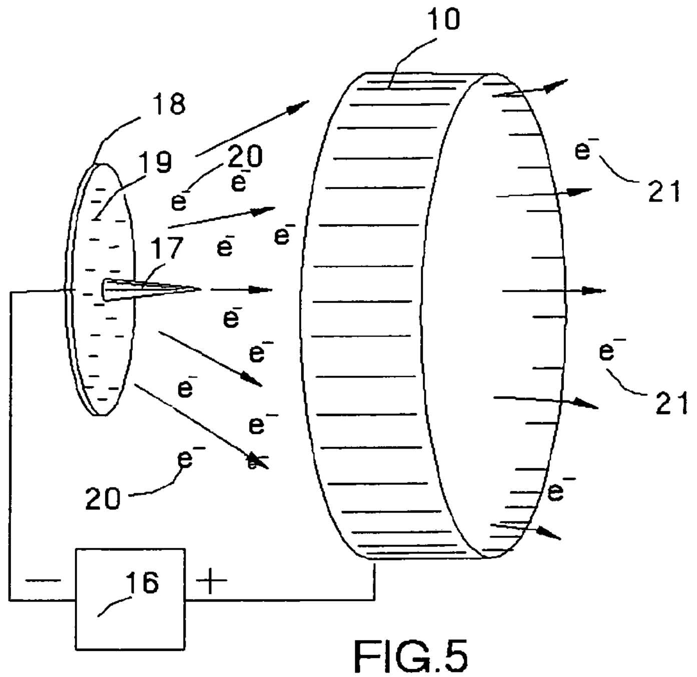
FIG. 5 schematically depicts an air cleaner wherein the ionizing needle is placed on a non-conducting or dielectric base surface which is charged by some of the ions and repels the other ions forwardly, away from the base surface.

FIG. **5*a* shows an end view of a variant on FIG. 5** wherein the cylindrical support has an insulated outer surface.

FIG. **5*b* is a pictorial view of a variant of the needle support of FIG. 5** showing protective pins around the needle.

Figure 6:
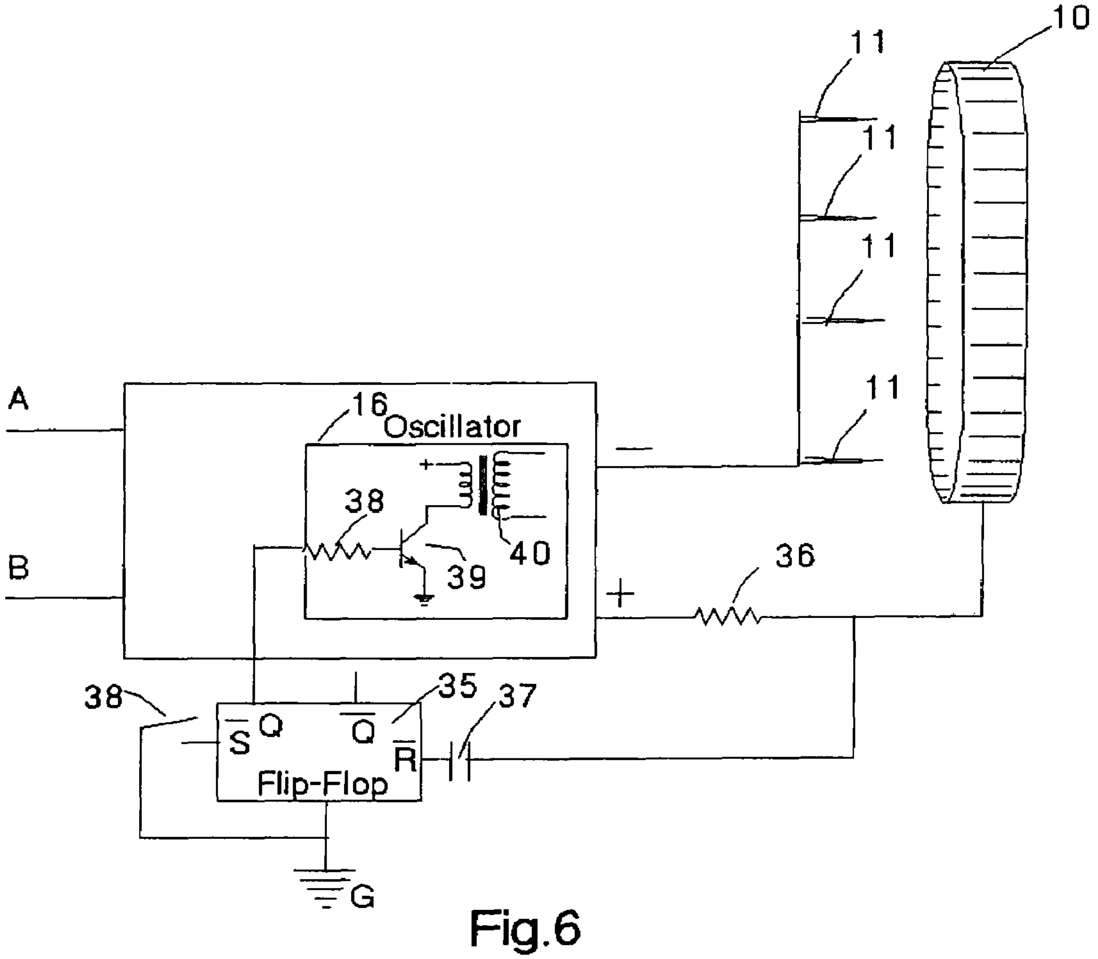

FIG. 6 is a drawing showing the circuit layout used to switch off the power supply in case of a discharge between a hand and the collector.

Figure 7:
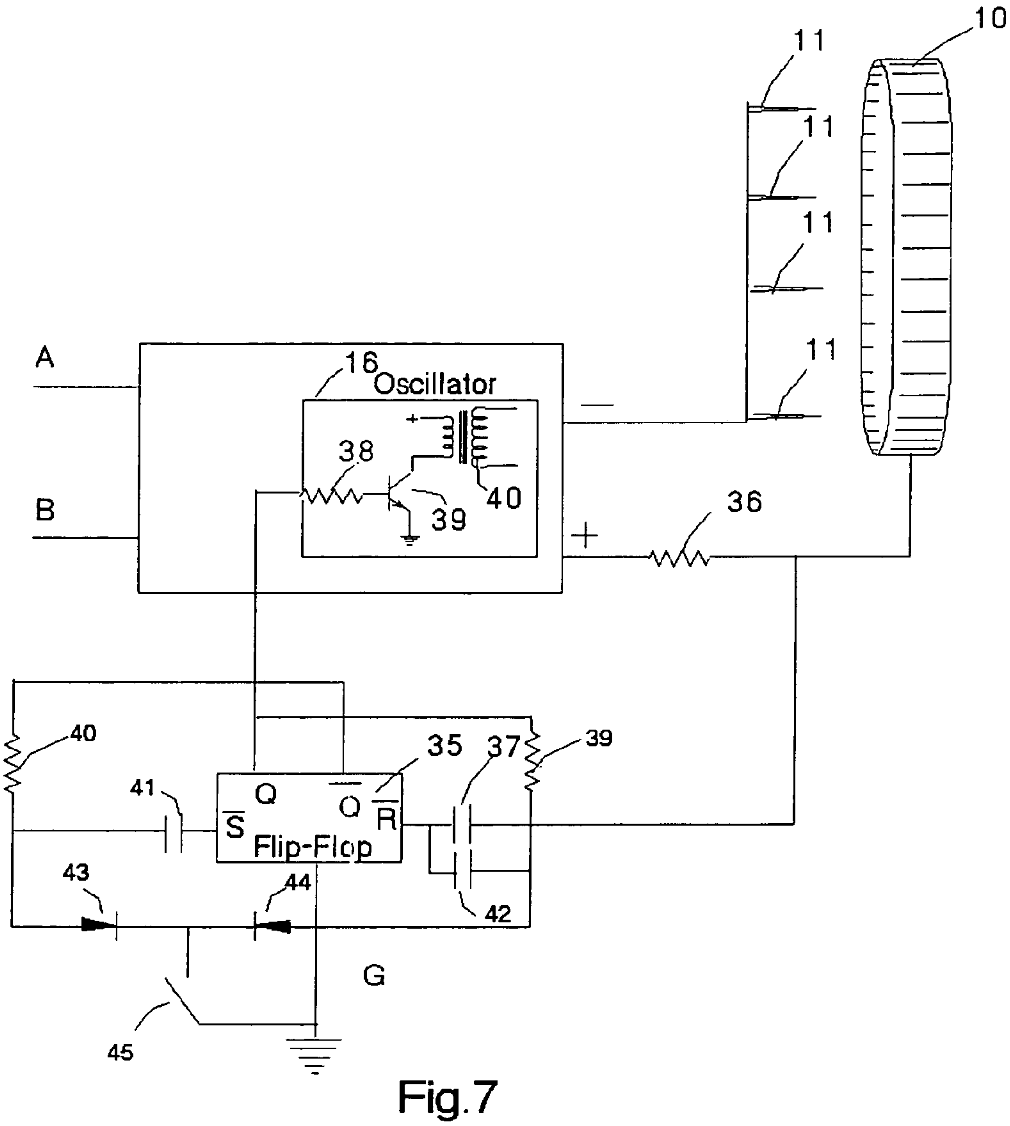

FIG. 7 is a schematic of a modification of the circuit of FIG. 6 wherein a single switch serves to both re-set the circuit into operation after it has been tripped off by a discharge and to act as an on-off switch.

DESCRIPTION OF THE PREFERRED EMBODIMENTS

Figure 1:
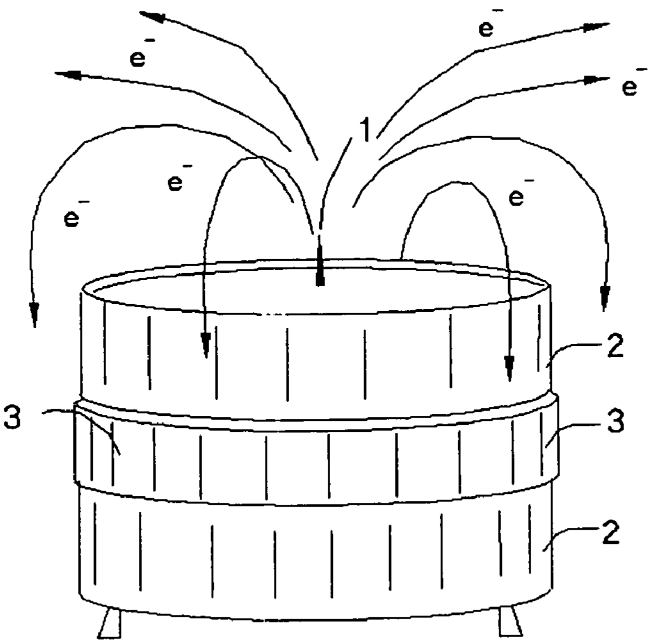
Fig. 1 (PRIOR ART)
FIG. 1 shows the arrangement of a dust collecting band which is positioned below the ionizing needle in the prior art.

FIG. 1 shows the prior art air cleaner unit mentioned in the U.S. Pat. No. 5,538,692 wherein the ionizing needle 1 is located on top of the insulated body of the unit 2. Collecting element 3 is located below the ionizing needle 1. Charged particles 4 flow away from the needle 1 and some are collected by the collector 3 and some are released in all directions into the surrounding space.

Figure 2:
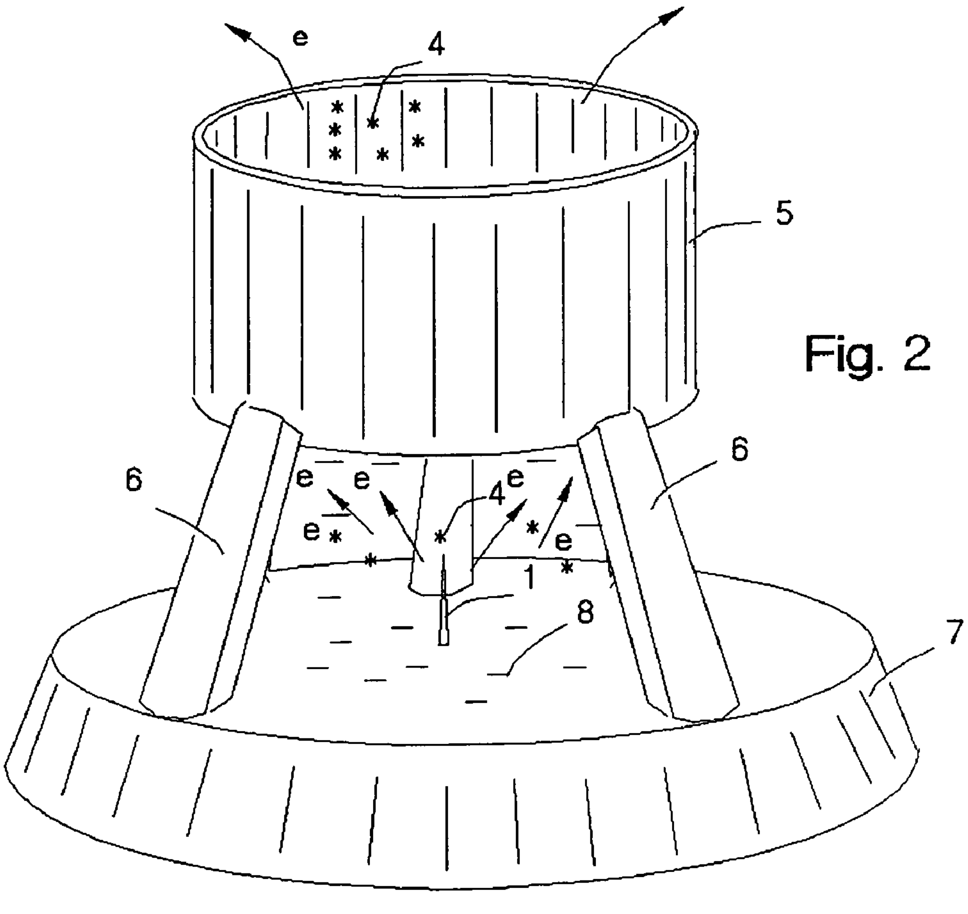
FIG. 2 shows an arrangement according to one preferred variant of the invention where the collecting surface is located above the ionizing needle and is of an air-flow containing cylindrical form. This Figure appears in U.S. Ser. No. 10/067,433.

FIG. 2 shows the variant of the present invention where a conducting cylinder 5 is located above the ionizing needle 1. The collector cylinder 5 is supported by insulating supports 6 over insulating base 7. Ions "e" generated by the needle 1 are attracted towards the inside surface of the cylinder 5, which also collects dust which has been charged by the ions. At the same time, the adjacent surrounding surface 8 around the base of the needle 1 becomes charged by the ions "e" created by needle 1 and acts as a repellant to the ions "e" with the result that the ions "e" are focused in the upward direction and do not travel horizontally outwards to escape into the surrounding space in various directions.

Air may pass freely over base 7, flowing to the needle 1 and upwardly through the cylinder 5. The dust particles 4, charged by the negative ions produced by the needle 1, are attracted by the positively charged conductive surface of the cylinder 5, which acts as a counter electrode to induce the formation of ions. Most of the charged dust 4 attracted by the charged inner collector surface of the cylinder 5 adheres to it.

The cylinder 5 in FIG. 2 may be readily removed from its support for cleaning. The relative position of the cylinder 5 and needle 1 requires only that they are in a spaced relationship so that, mixed with air, ions will flow from the needle 1 to the cylinder 5, and principally to the inner core of the cylinder 5.

Figure 3:
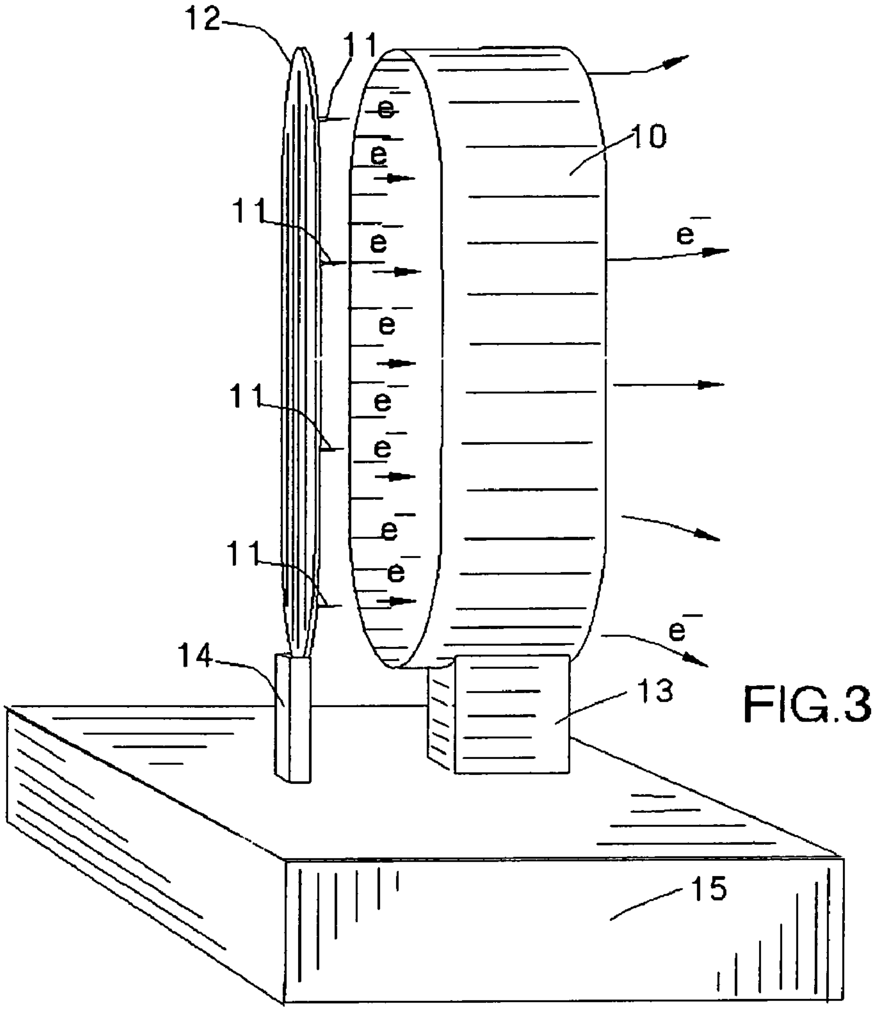
FIG. 3 shows a re-oriented variant arrangement of the invention of FIG. 2 where the cylindrical collector is oval shaped and is horizontally aligned. In this case multiple ionizing needles are present.
Figure 4:
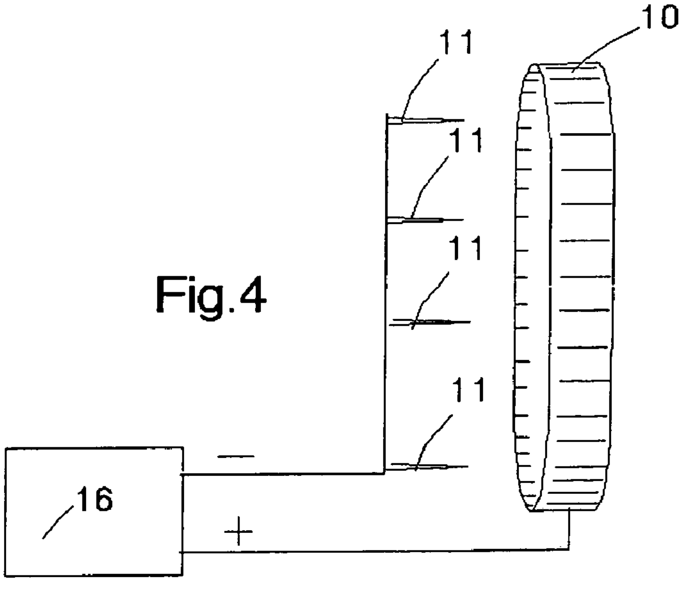
FIG. 4 shows diagrammatically how the electrical connections of FIG. 3 are made to the components.

FIG. 3 shows another implementation of the invention wherein a collector 10 is oval in shape and held by insulating support 13 above unit base 15. An oval shape is cylindrical in the broader sense of the meaning of "cylindrical". It provides inner dust collecting electrode surfaces which are opposed to or facing each other. A plurality of ionizing needles 11 are each mounted on a common insulating base 12 for repelling the ions emitted by the needles 11 in the direction of the collector 10, similarly in action to the surface 8 of the air cleaner shown in FIG. 2. This arrangement minimizes the tendency for any ions to be directed sideways away from the collector 10. Within the base 15 of the unit is a high voltage power supply 16. FIG. 4 shows how the needles 11 and the collector 10 are connected to the high voltage power supply 16, as well as the positioning of the needles 11 with respect to the collector 10.

FIG. 5 shows an arrangement to demonstrate the effect of an individual insulating base 18 in the middle of which an ionizing needle 17 is attached. The base 18 is of a minimal size so as to permit air to flow past it to supply the ion wind. Ions 20 emitted by needle 17 charge the surface of the insulative/dielectric base 18 with fixed charges 19. Charges 19, being of the same polarity as the ions 20 emitted by needle 17, are repelled and are directed in the forward direction towards the collector 10. In this way, the emission of ions sideways from the needle 17 and away from the cylindrical collector 10 is suppressed.

It was found that, at small ratios, the greater the ratio between the diameter of the base to the length of the needle, the greater the directivity of the ions emitted by the needle. In the actual unit built this ratio was about 3:1, with the needle set-back from the upstream edge of the conductive collector surface by 5 needle lengths. This arrangement caused substantially no ions to be emitted sideways while providing a satisfactory ion wind. This 3:1 ratio may be reduced to 2:1 or even 1:1 with some loss of ions eventually arising.

Figure 5A:
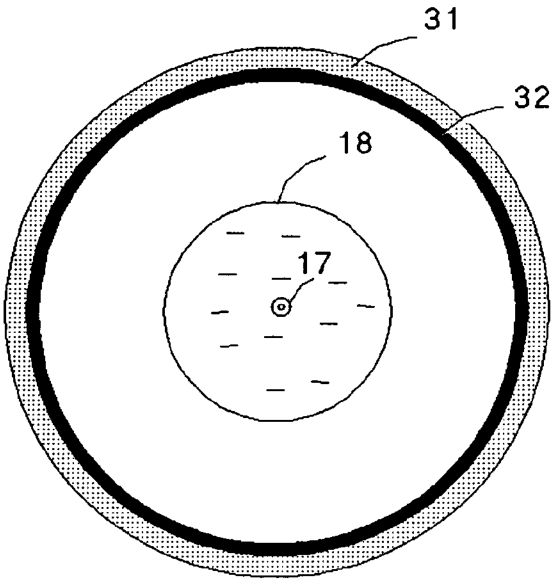
Figure 5B:
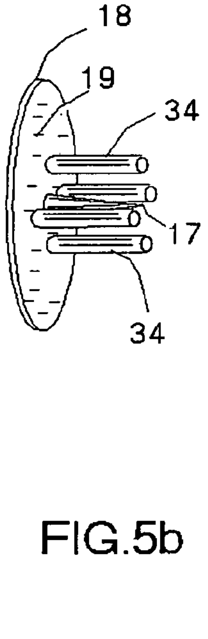

FIG. 5*b* shows a variant on FIG. 5 wherein an ionizing needle 17, attached to a base 18 is surrounded by thin, non-conducting upright needle protectors 34 that are slightly longer than a needle 17 to protect anyone from touching the needle 17. These protectors 34 may be in the form of posts or plates. They are sufficiently separated from the needle 17 so as to avoid any substantial suppression of the release of ions.

In FIG. 5*a* a non-conductive outer cover 31 on the collector cylinder enshrouds conducting inner collector surface 32. Cover 31, being an insulator that preferably will hold fixed charges, assists in assuring that the ionic wind passes substantially only through the inside of the collector ring 32 and that dust is collected substantially only on the inside collector surface 32.

In FIG. 6, the high voltage power supply 16 receives power from leads A and B. This may be low voltage DC, eg. 24 volts or an AC source that is rectified within the power supply by standard circuitry (not shown). In FIG. 6 the "−" output terminal of the high voltage power supply 16 is connected to the needles 11 and the "+" terminal is connected to the collector 10 via current limiting resistor 36. These polarities can be reversed. This resistor 36, if large enough, will minimize the shock effect of persons touching the collector 10. Further protection can be provided as follows.

If a discharge occurs on the collector 10, the extra current of the discharge will pass through the current-limiting resistor 36 which will develop a spike voltage. This spike voltage will pass through capacitor 37 to reset terminal R of flip-flop 35. The Q output of the flip-flop will then go to a low state, grounding and cutting off the bias voltage which is supplied by resistor 38 to the base of transistor 39. Transistor 39 drives transformer 40 and with other standard circuit elements (not shown) operating as part of an oscillator. While a transformer 40 is shown, any high voltage circuitry may be employed, e.g. a ladder network. Cutting the bias voltage to transistor 38 will stop the oscillations thus shutting off the high voltage. To restart the power supply, "Set" switch 38 is depressed.

FIG. 7 shows a circuit by which the unit can be turned ON and OFF by a single switch. It operates as follows: The flipflop 35 is a bistaple device where either the Q output or the Q ("Q-bar") is in its high state. Assuming the Q is in its high state, capacitor 42 will charge through resistor 39 and the biasing resistor 38 will provide bias to oscillator 16 which provides power to the high voltage unit. If then switch 45, a momentary action switch, is closed momentarily, the positive side of capacitor 42 will be grounded through diode 44 and provide a negative pulse to the reset inut of the flipflop. The state of the flipflop will change making Q to go low thus cutting off the bias of the oscillator. At the same time, capacitor 41 will not be affected since there was no voltage in it. If the switch 45 is closed again, the opposite will happen. Capacitor 41, which is now charged through resistor 40, will be grounded through diode 43 and put a negative pulse on the Set inputs of the flipflop and Q will go high and the oscillator will turn ON again. If in this state a discharge were to occur on the collector 10, capacitor 37 will pass a negative spike voltage to the reset input R to the flipflop and the unit will shut off. A further closure of switch 45 will again restore power. The same system could also be achieved using two transistors connected in a flipflop arrangement or as a JK flipflop but the arrangement described is one method that has proved to be satisfactory.

Operation of the air cleaner is as follows: The high voltage connected to the ionizing needle(s) produces ions that are repelled by each other and by the fixed charges on their surrounding individual base(s) towards the conductive collector which is connected to the other side of the high voltage power supply. The collector acts as a counter-electrode, inducing an ion wind. The electron wind generated by the ions moving from the ionizing needle(s) is directed towards the collector and passes through the interior of the collector where the ions are neutralized by the conductive surface of the collector. Dust particles which are in the air and which have become charged by the ions, are attracted by the collector and stick to it. The only maintenance required is to wipe the inside of the ring when it gets dirty.

It should be understood that, although the above specification refers to ionizing needle(s), these can be substituted with any other means of producing ions such as conductive carbon or graphite filaments and the like, and even fine wires. However, pointed ion sources are preferred as they produce less ozone.

It should also be understood that "cylinder" as used herein refers to cylindrical shapes in the broad sense and is not restricted to right circular cylinders. Further, it is preferable that cylinders employed in the invention have a length in order to guide the air flow that is at least as long as half the width of the cylinder (in its narrowest dimension when an oval format collector is employed), more preferably at least the width of the cylinder.

CONCLUSION

The foregoing has constituted a description of specific embodiments showing how the invention may be applied and put into use. These embodiments are only exemplary. The invention in its broadest, and more specific aspects is further described and defined in the claims which now follow. These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. An air cleaner for removing dust from ambient room air, comprising:

a) at least one ion source;

b) an elongated, generally cylindrical collector electrode support of non-conductive material supported by a base and having:

I) an upstream edge proximate to the ion source, ii) an outside surface, and iii) one or more inside surfaces defining an inner volume there between and aligned with said ion source to serve as an airflow guide, said ion source being mounted exterior to said inner volume with said one or more inside surfaces extending away from said ion source;

c) a collector electrode having a chargeable dust-collecting surface formed on at least a portion of said one or more inside surfaces of said elongated, generally cylindrical collector electrode support of non-conductive material, said dust-collecting surface being a surface from which dust may be readily removed by manual cleaning while the elongated, generally cylindrical collector electrode support of non-conductive material is supported by said base; and d) a high voltage power supply capable of providing an ionizing potential for connection between said ion source and said dust-collecting surface;

wherein said dust-collecting surface, acting as a counter-electrode, is positioned to induce the release of ions from said ion source and cause an ionic wind generated by said ion source and entraining dust to pass as an air flow through said inner volume of said elongated, generally cylindrical collector electrode support of non-conductive material and over said dust-collecting surface for collection by said dust-collecting surface of dust from the air that has been charged by ions emitted by said ion source; and wherein the dust collecting surface is exposed for manual access to allow manual cleaning and removal of dust collected on the dust-collecting surface while the elongated, generally cylindrical collector electrode support of non-conductive material is supported by said base.

2. An air cleaner as in claim 1 comprising an insulative, charge-fixing surface positioned behind said ion source remote from said dust-collecting surface to become charged by the ions emitted by said ion source and oriented to direct an ionic wind in the direction of said dust-collecting surface.

3. An air cleaner as in claim 1 wherein said elongated, generally cylindrical collector electrode support of non-conductive material is a cylindrical electrode support enclosing said inner volume.

4. An air cleaner as in claim 3 wherein said dust-collecting surface is spaced from said ion source to substantially eliminate any flow of the ionic wind of air otherwise than through the inner volume within said cylindrical support.

5. An air cleaner as in claim 1 wherein said elongated, generally cylindrical collector electrode support of non-conductive material is detachable from said base to permit separate cleaning of the dust collecting surface.

6. An air cleaner as in claim 1 wherein the dust collecting surface is mounted above said ion source.

7. An air cleaner as in claim 1 wherein the dust collecting surface is mounted in horizontal alignment with said ion source.

8. An air cleaner as in claim 1 comprising a protective circuit said circuit being: (a) connected to the collector electrode to detect a discharge occurring on the conductive collecting surface; and, (b) connected to the high voltage power supply to correspondingly shut off the high voltage power supply when a discharge is detected on the collector electrode.

9. An air-cleaner as in claim 8 comprising a flip-flop circuit with a Re-set switch input, said Re-set switch input being connected to the dust collecting surface through capacitor to respond to a discharge occurring on the dust collecting surface, disabling the high voltage power supply by switching to ground a portion of the high voltage power supply.

10. An air cleaner as in claim 9 wherein said flip-flop circuit includes a Set switch and further comprising circuit means whereby, by activating the Set switch the flip-flop circuit will re-enable the high voltage power supply.

11. An air cleaner as in claim 10 wherein said Set switch is a single momentary action switch which is connected to the flip-flop circuit through an ON-OFF circuit means to serve as both said Set switch and as an ON-OFF switch for the high voltage power supply.

12. An air cleaner for removing dust from ambient room air, comprising:

a) at least one ion source;

b) an elongated, generally cylindrical collector electrode support of non-conductive material supported by a base and having:

I) an upstream edge proximate to the ion source, ii) an outside surface, and iii) one or more inside surfaces defining an inner volume there between and aligned with said ion source to serve as an airflow guide, said ion source being mounted exterior to said inner volume with said one or more inside surfaces extending away from said ion source;

c) a collector electrode having a chargeable dust-collecting surface formed on at least a portion of said one or more inside surfaces of said elongated, generally cylindrical collector electrode support of non-conductive material, said dust-collecting surface being a surface from which dust may be readily removed by manual cleaning while the elongated, generally cylindrical collector electrode support of non-conductive material is supported by said base;

d) a high voltage power supply capable of providing an ionizing potential for connection between said ion source and said dust-collecting surface;

e) a protective circuit said circuit being: (I) connected to the collector electrode to detect a discharge occurring on the conductive collecting surface and, (ii) connected to the high voltage power supply to correspondingly shut off the high voltage power supply when a discharge is detected on the collector electrode;

wherein said dust-collecting surface, acting as a counter-electrode, is positioned to induce the release of ions from said ion source and cause an ionic wind generated by said ion source and entraining dust to pass as an air flow through said inner volume of said elongated, generally cylindrical collector electrode support of non-conductive material and over said dust-collecting surface for collection by said dust-collecting surface of dust from the air that has been charged by ions emitted by said ion source; and wherein the dust collecting surface is exposed for manual access to allow manual cleaning and removal of dust collected on the dust-collecting surface while the elongated, generally cylindrical collector electrode support of non-conductive material is supported by said base.

13. An air-cleaner as in claim 12 comprising a flip-flop circuit with a Re-set switch input, said Re-set switch input being connected to the dust collecting surface through capacitor to respond to a discharge occurring on the dust collecting surface, disabling the high voltage power supply by switching to ground a portion of the high voltage power supply.

14. An air cleaner as in claim 13 wherein said flip-flop circuit includes a Set switch and further comprising circuit means whereby, by activating the Set switch the flip-flop circuit will re-enable the high voltage power supply.

15. An air cleaner as in claim 14 wherein said Set switch is a single momentary action switch which is connected to the flip-flop circuit through an ON-OFF circuit means to serve as both said Set switch and as an ON-OFF switch for the high voltage power supply.

16. An air cleaner for removing dust from ambient room air, comprising:

a) at least one ion source;

b) an elongated, generally cylindrical collector electrode support of non-conductive material supported by a base and having:

I) an upstream edge proximate to the ion source, ii) an outside surface, and iii) one or more inside surfaces defining an inner volume there between and aligned with said ion source to serve as an airflow guide, said ion source being mounted exterior to said inner volume with said one or more inside surfaces extending away from said ion source;

c) a collector electrode having a chargeable dust-collecting surface formed on at least a portion of said one or more inside surfaces of said elongated, generally cylindrical collector electrode support of non-conductive material, said dust-collecting surface being a surface from which dust may be readily removed by manual cleaning while the elongated, generally cylindrical collector electrode support of non-conductive material is supported by said base;

d) a high voltage power supply capable of providing an ionizing potential for connection between said ion source and said dust-collecting surface;

wherein said dust-collecting surface, acting as a counter-electrode, is positioned to induce the release of ions from said ion source and cause an ionic wind generated by said ion source and entraining dust to pass as an air flow through said inner volume of said elongated, generally cylindrical collector electrode support of non-conductive material and over said dust-collecting surface for collection by said dust-collecting surface of dust from the air that has been charged by ions emitted by said ion source;

wherein the dust collecting surface is exposed for manual access to allow manual cleaning and removal of dust collected on the dust-collecting surface while the elongated, generally cylindrical collector electrode support of non-conductive material is supported by said base; and wherein the outside surface of said elongated, generally cylindrical collector electrode support of non-conductive material, at least in the region of its upstream edge, is of a material which is non-conductive with the capacity to receive and hold charge originating from the ion source and thereby reduce the extent of flow of the air over said outside surface, directing said flow in the direction of said dust-collecting surface.

17. An air-cleaner as in claim 16 comprising a flip-flop circuit with a Re-set switch input, said Re-set switch input being connected to the dust collecting surface through capacitor to respond to a discharge occurring on the dust collecting surface, disabling the high voltage power supply by switching to ground a portion of the high voltage power supply.

18. An air cleaner as in claim 17 wherein said flip-flop circuit includes a Set switch and further comprising circuit means whereby, by activating the Set switch the flip-flop circuit will re-enable the high voltage power supply.

19. An air cleaner as in claim 18 wherein said Set switch is a single momentary action switch which is connected to the flip-flop circuit through an ON-OFF circuit means to serve as both said Set switch and as an ON-OFF switch for the high voltage power supply.

* * * * *